Dec. 29, 1931.  W. F. PENNOCK  1,838,497
AUTOMOBILE HEATING APPARATUS
Filed April 16, 1928
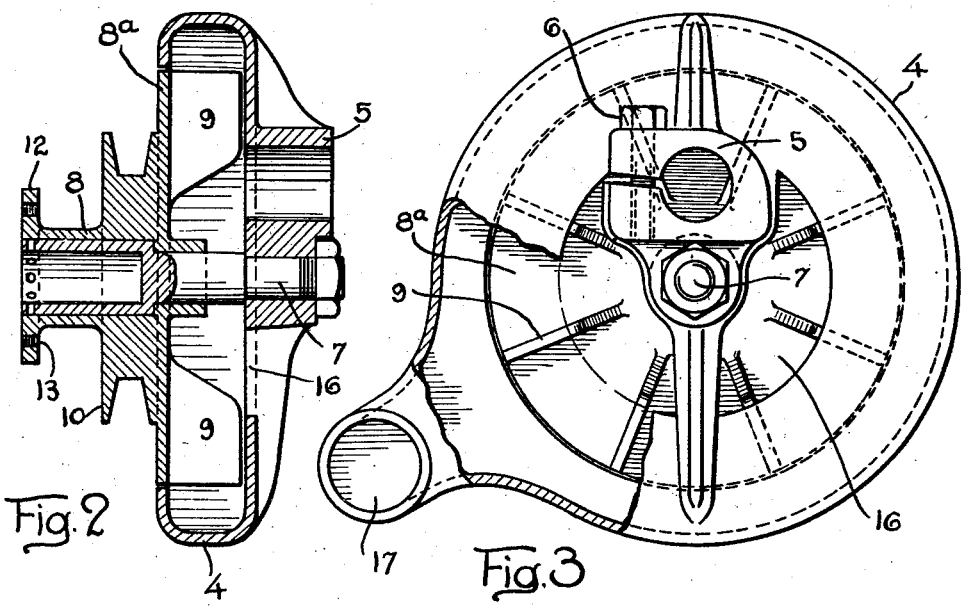
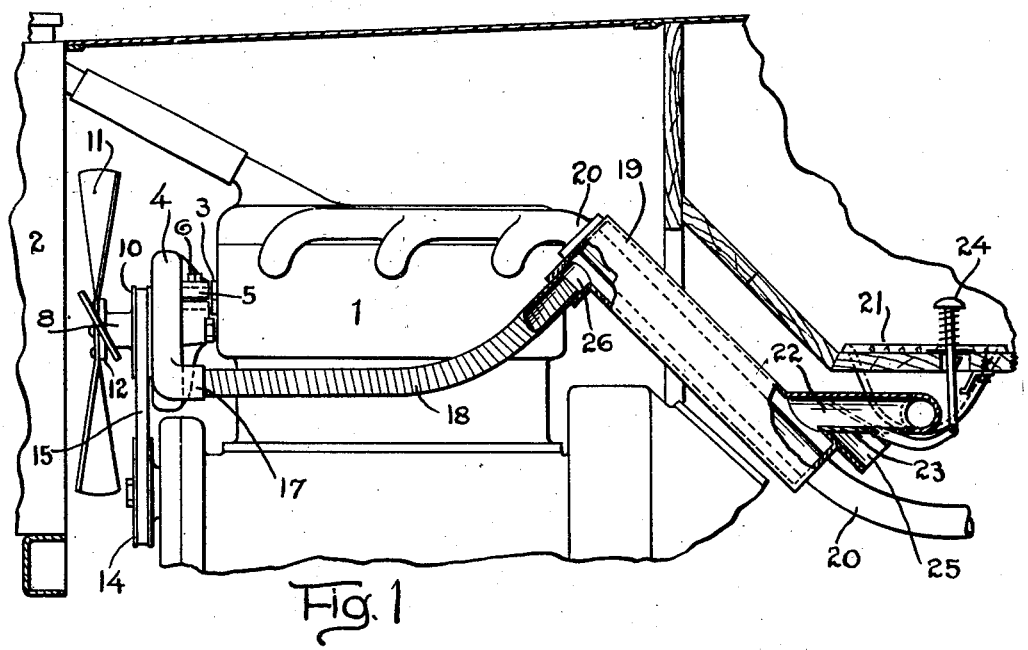
INVENTOR
Warren F. Pennock
BY
*Stuart C. Barnes*
ATTORNEY Patented Dec. 29, 1931                                              1,838,494

UNITED STATES PATENT OFFICE

WARREN F. PENNOCK, OF DETROIT, MICHIGAN

AUTOMOBILE HEATING APPARATUS

Application filed April 16, 1928. Serial No. 270,239.

This invention relates to the heating of the interior of automobile bodies, and has to do especially with an apparatus for force-feeding air which is heated, or which is to be heated during the feeding into the interior of the automobile body.

It is an aim of the invention to provide an apparatus which can be readily installed on an automobile engine in a position so that it may be driven by a driving device customarily found on such engines. More specifically, the invention contemplates an apparatus which includes an air driving fan and which is arranged to be installed at the front of an engine so that the air driving fan can be driven with the usual radiator fan driving belt.

It is appreciated that forced air feeding for automobile heaters is not a broadly new idea inasmuch as radiator fans have been used for this purpose by merely placing a suitable funnel-shaped air inlet to the rear of such fans. However, this arrangement forces dust laden air into the automobile. This invention utilizes a separate air driving fan which is constructed and housed so that particles of dust, dirt, or the like, is separated from the draft of air before it is pumped into the interior of the automobile.

In the accompanying drawings:

Fig. 1 is a side elevation of an automobile engine with parts of the automobile body and hood cut away and some of the parts shown in section, showing the invention applied to such engine.

Fig. 2 is a sectional view taken through the apparatus.

Fig. 3 is a rear plan view of the apparatus with some of the parts cut away.

Ordinarily the conventional radiator fan is mounted at the front of the engine by means of a bracket which in turn is carried by a suitable stud on the engine. The construction as shown in the accompanying drawings is designed, in a way, to replace this bracket for supporting the conventional radiator fan, and this construction embodies a separate air pumping fan for heating purposes.

An automobile engine is shown at 1, a radiator at 2, and the engine is provided with a projecting stud 3. The apparatus of the invention includes a housing 4 supplied with a split collar 5 adapted to fit over the stud 3, and which may be clamped thereto by means of a suitable screw threaded bolt 6. A stud or spindle 7 is carried by this housing, and supported on this spindle is a fan element 8.

Preferably the housing 4 is of one-piece construction which may advantageously be an aluminum casting, and the fan element 8 is also preferably of one-piece construction. This fan element has blades 9 disposed within the housing, and on the outside of the housing it takes the form of a pulley 10. The conventional radiator fan 11 is to be attached to this element, and for this purpose the element may be flanged, as at 12, and provided with screw threaded openings 13 so that the fan 11 may be secured thereto. These openings 13 may not be screw threaded, but may be plain rivet or bolt-receiving openings for the purpose of securing the fan thereto. Referring to Fig. 1, the usual fan belt pulley 14, customarily associated with the timing gears, is connected to the pulley 10 by means of a suitable belt 15.

The fan element has a disk portion 8a which is in substantial alignment with the opening in the housing which receives the fan element so that the front of the housing is substantially closed. The blades 9 are on one side of the disk and the pulley on the other. The spindle 7 may be hollow, as shown, for the purpose of receiving lubricant.

The housing 4 has an air inlet positioned on its rearward side; in other words, the air inlet is next adjacent the engine. This air inlet is shown at 16. The housing also has an air outlet 17 which may be connected by a suitable flexible conduit to a heating element 19. This element 19 may be in the form of a casing which surrounds a part of the exhaust gas conduit 20.

Within the car there is provided a radiator 21 connected to the heater element by suitable air conduit connections 22. It is thought desirable to provide a valve construction for controlling the heating action, and for this purpose there is provided a valve 23 operably connected with the controlling handle 24 inside the car. This valve is arranged to alternately open or close the discharge outlet 25 for the air, and an air inlet 26 for the heater.

This apparatus may be placed on automobiles by the manufacturer and included as original equipment; on the other hand, it may be in the form of an accessory and applied to various automobiles at any time. To do this, as above pointed out, the fan and its bracket are removed and the housing is placed on the supporting arm 3 which previously held the bracket. Of course, the heater proper 19 can be of any desirable type other than in the form of a shell, around the manifold or exhaust pipe, such as a heater inserted directly in the exhaust line.

The impeller or air fan may be of a centrifugal type as shown. The air is drawn into the fan through the opening 16 positioned to the rear of the housing. There is an inrush of air through the radiator effected by the fan 11, and the air which enters the impeller housing reverses in its movement thus causing a separation of the air and solid particles therein which, due to their weight, has sufficient inertia to prevent their quick reversal of movement so that the air which is pumped into the interior of the automobile body is eliminated of much dirt and the like.

On many of the present day cars, the radiator for the engine is equipped with shutters which are closed when the engine is cool, as for example, in very cold weather. This is just the time when heat is necessary for the inside of the car. However, where the funnel device is placed to the rear of the radiator fan for pumping air through the heater, no heat can be had because no air is coming in through the radiator.

A still further feature by the present invention marks an advancement, in the fact that by utilizing this fan a very strong current of air is effected. When an engine is first started up, the exhaust passageways heat up rapidly and in the present construction there is a strong draft of air into the car to insure immediate heating of the car, whereas a decidedly weak draft is set up by using the radiator fan and requires the driving of the car a considerably longer distance before any appreciable heat is felt.

Moreover, with the arrangement shown, the valve construction can be positioned in the summertime, so that air is forced through the heater and exhausted to the atmosphere. By reason of the heavy draft of air there is an effective cooling action on the exhaust pipe and the fore part of the interior of the car is thus kept from getting hot. The heating of the fore part of the interior part of the car is annoying, especially on long trips in the summertime, as the feet of the occupants in the front seat of the car are in close proximity to the hot exhaust pipe, and it is equally desirable to keep this cool in hot weather

Claims:

1. In a device of the type described, an internal combustion engine of an automotive vehicle having a stud projecting therefrom, a housing, a clamp on the housing for receiving the stud and clamping the same for holding the housing in place, a spindle carried by the housing and positioned substantially centrally thereof, a rotary element journaled on the spindle, impeller vanes on the rotary element located within the housing, a pulley for receiving a belt on the outside of the housing, a wall on the rotary element positioned between the pulley and the vanes and positioned in alignment with the housing walls to substantially close the housing, and means substantially at the end of the rotary element remote from the housing for supporting an engine cooling fan.

2. In a device of the type described, an internal combustion engine of an automotive vehicle having a stud projecting therefrom, a housing, a clamp on the housing for receiving the stud and clamping the same for holding the housing in place, a spindle carried by the housing and positioned substantially centrally thereof, a rotary element journaled on the spindle, impeller vanes on the rotary element located within the housing, a pulley for receiving a belt on the outside of the housing, a wall on the rotary element positioned between the pulley and the vanes and positioned in alignment with the housing walls to substantially close the housing, and means substantially at the end of the rotary element remote from the housing for supporting an engine cooling fan, said housing having an air inlet port and an air outlet port.

In testimony whereof I affix my signature.

WARREN F. PENNOCK.